United States Patent

[11] 3,609,286

| [72] | Inventors | Yves Bresson<br>Coublevie;<br>Roger Lorain, Issoire; Marcel Brillant,<br>Fontenay le Fleury, all of France |
|---|---|---|
| [21] | Appl. No. | 775,524 |
| [22] | Filed | Nov. 13, 1968 |
| [45] | Patented | Sept. 28, 1971 |
| [73] | Assignee | Cegedur GP<br>Paris, France |
| [32] | Priority | Nov. 17, 1967 |
| [33] | | France |
| [31] | | 128,587 |

[54] PROCESS FOR TREATMENT OF ALUMINUM AND ALLOYS OF ALUMINUM FOR RESISTANCE WELDING
3 Claims, No Drawings

[52] U.S. Cl. .................................................. 219/117 R, 117/127, 148/25
[51] Int. Cl. ...................................................... B23k 11/00, B23k 35/36
[50] Field of Search ........................................... 117/127, 134; 148/23, 25; 219/72, 73, 117 R

[56] References Cited
UNITED STATES PATENTS

| 1,697,845 | 1/1929 | Adams .......................... | 148/23 X |
| 2,056,894 | 10/1936 | Bretschger .................... | 117/135 X |
| 2,471,889 | 5/1949 | Paliwoda et al. ............... | 117/127 UX |
| 2,976,179 | 3/1961 | Westlund, Jr. et al. ......... | 117/135 X |
| 3,220,873 | 11/1965 | Wesley .......................... | 117/135 X |
| 3,455,716 | 7/1969 | Loring et al. .................. | 117/135 X |

*Primary Examiner*—Alfred L. Leavitt
*Assistant Examiner*—J. R. Batten, Jr.
*Attorney*—McDougall, Hersh, Scott & Ladd ABSTRACT: The treatment of the surfaces of aluminum and alloys of aluminum to improve the cleaning frequencies in resistance welding by application to the surfaces of a mineral oil mixture containing at least 60 percent by weight naphthenes with the remainder comprising paraffinic hydrocarbons with or without a small amount of additives in the form of dopes of unctuous viscosity or anticorrosive materials.

PROCESS FOR TREATMENT OF ALUMINUM AND ALLOYS OF ALUMINUM FOR RESISTANCE WELDING

This invention is addressed to the preparation of the surfaces of aluminum and alloys thereof for resistance welding, such as spot welding, or roller welding, hereinafter generally included within the term "spot welding."

For comparison between spot welding, as between the spot welding of aluminum or alloys of aluminum with the spot welding of steel, the comparison is based upon electrode cleaning frequencies. The term relates to the number of weld points capable of being produced between the compulsory electrode cleaning or cleansing operations, as required to insure successful weld points. A high cleaning frequency is indicative of a low unproductive period for cleaning and a high number of weld points between two electrode cleaning operations. For example, with steels as currently employed in automobile bodies, electrode cleaning frequencies of the order of 6,000 to 12,000 weld points are achieved, while with aluminum or alloys of aluminum, the electrode cleaning frequencies rarely exceed the 100 weld points between electrode cleaning operations when conventional methods for surface preparation are employed, such as degreasing followed by one or more pickling operations before welding.

In our French Pat. No. 1,166,746, description is made of the treatment of the surfaces of aluminum to be welded with organic nitrogenous compounds and higher alcohols, with or without hydrocarbon dilution. Such treatment raises the cleaning frequency to the vicinity of 2,000 to 3,500 weld points.

It is an object of this invention further to increase the cleaning frequencies for spot welding of aluminum or alloys of aluminum and it is a related object to provide such improved cleaning frequencies by a simple and inexpensive treatment which has long life and lasting effect.

In accordance with the practice of this invention, the electrode cleaning frequencies for spot welding aluminum and alloys of aluminum can be raised to above 3,500 weld points, and in many cases to 10,000 or more weld points, by application to the surfaces before welding, and preferably to the faces of the portions directly contacted by the welding electrodes, of a suitable mineral oil in the form of a mixture of hydrocarbons containing at least 60 percent by weight naphthenes with paraffinic hydrocarbons making up the remainder except for such possible additives as unctuosity or viscosity or anticorrosion dopes.

As used herein, the term "naphthenes" is meant to refer to saturated mono- or polycyclic hydrocarbons having the general formula $C_nH_{2n}$, with or without one or two saturated side chains. Such naphthenes are generally referred to as naphthenic petroleum products. The term "parafinnic hydrocarbons" is meant to refer to saturated acyclic hydrocarbons having the general formula $C_nH_{2n+2}$. The nature of the paraffinic hydrocarbons and dopes, if present, have little influence on the electrode cleaning frequency as long as the hydrocarbon mineral oil mixture contains at least 60% naphthenes.

When use is made of the concepts of this invention, the parts to be welded need not be pickled or brushed before application of the mineral oil. It is sufficient if application is made to surfaces which are flat, clean, dry and relatively free from dust or corrosion, such as the aluminum sheets issuing from a rolling mill. Sheets issuing from a rolling mill, flanging press, cutting machine and coated with the described hydrocarbon mixture can be welded with high electrode cleaning frequencies, even after storage for months, especially when protected from dust and moisture.

Application of the mineral oil mixture can be made to the parts by means of a brush, spray gun, roller coater, cloth, pad or the like, or by means of an oiling machine. A very thin film of oil, such as that formed on sheets of aluminum issuing from a rolling mill which employs the hydrocarbon oil as a lubricant, is not sufficient to give a high electrode cleaning frequency. On the other hand, a thin mineral oil film of the type described is sufficient when applied to locate the film between the portions to be welded. In general, it is desirable to make use of a relatively thick film of the mineral oil mixture on the faces which come into direct contact with the electrodes.

The following examples are given by way of illustration of the invention, and not by way of limitation thereof:

EXAMPLE 1

Sheets to be spot welded are made of A–U$_2$G alloy, containing 2.6% by weight copper, 0.4% by weight magnesium, the remainder being 99.5% by weight aluminum, with the sheets of aluminum in the tempered and aged condition. This aluminum alloy is currently used in the production of body parts of automotive vehicles.

The assembly comprises two sheets having a thickness of 0.8 mm. wiped with a clean cloth without pickling. The two faces of each of the sheets are brushed coated in the welding zone with a mineral oil containing approximately 62% by weight naphthenes and 38% by weight paraffinic hydrocarbons. The kinematic viscosity of the mixture at 20° C. is 990 centistokes. Its electrical resistivity is $4.10^9$ ohm/cm.

In the course of different series of spot welding operations, cleaning frequencies of 9,000±1,5000 weld points are obtained. The welds are of high quality, the shearing strength of each of these points being within the range of 175 kgf. to 225 kgf.

Without the described oil treatment, cleaning frequencies higher than 150 weld points cannot be achieved.

EXAMPLE 2

The same sheets as in Example 1 are spot welded but the two faces are roller coated 4 months before welding with a mineral oil mixture containing approximately 70% by weight naphthenes and 30% by weight paraffinic hydrocarbons and having a kinematic viscosity at 20° C. of 52 centistokes and an electrical resistivity of $5.10^9$ ohm/cm. Cleaning frequencies of 10,000±1,500 weld points are obtained with the welds of a quality comparable to that of Example 1. The shearing strength of the weld points is approximately 200 kgf.

EXAMPLE 3

Sheets made of A–G$_3$ alloy containing 3.2% by weight magnesium, 0.3% by weight manganese and the remainder being 99.5% by weight aluminum, are spot welded in the annealed condition. The assembly comprises two sheets having a thickness of 1 mm. The sheets are not subjected to any preliminary cleaning but remain as delivered by the manufacturer. The welding zone is lightly spray coated immediately before welding, only on the external faces of the sheets, with a mineral oil mixture containing approximately 65% by weight naphthenes, 34.5% by weight paraffinic hydrocarbons and 0.5% by weight bacon oil, added as an unctuous dope. The kinematic viscosity of the mixture, without the bacon oil, at 20° C. is 22 centistokes and its electrical resistivity is $5.10^9$ ohms/cm.

Cleaning frequencies of 5,000±1,300 weld points are obtained with the shearing resistance ranging from 130 kgf. to 180 kgf. Without the oil, cleaning frequencies which exceed 100 weld points cannot be obtained.

It will be apparent from the foregoing that we have provided an improvement in the pretreatment of surfaces of aluminum and alloys of aluminum which greatly increases the cleaning frequencies or weld points capable of being obtained by the cleaning operations.

It will be understood that changes may be made in the details of formulation and application without departing from the spirit of the invention, especially as defined in the following claims.

1. In the method for resistance welding of aluminum and aluminum alloys, the improvement for preparing the surface to be welded to increase the electrode cleaning frequency comprising applying to the surface to be welded a mineral oil mixture consisting essentially of at least 60% by weight naphthenic hydrocarbons with the balance being paraffinic hydrocarbons having the general formula $C_nH_{2n+2}$.

2. The process as claimed in claim 1 in which the mineral oil mixture of hydrocarbons is applied only to the faces of the parts which are to be in direct contact with the welding electrodes.

3. The process as claimed in claim 1 in which the mineral oil mixture of hydrocarbons is applied to surfaces of the parts before welding.

UNITED STATES PATENT OFFICE
CERTIFICATE OF CORRECTION

Patent No. 3,609,286  Dated September 28, 1971

Inventor(s) Yves Bresson et al.

It is certified that error appears in the above-identified patent and that said Letters Patent are hereby corrected as shown below:

Column 1, line 54, $C_nH_{2+42}$ should read $C_nH_{2n+2}$

Column 2, line 19, "brushed" should read "brush"

Signed and sealed this 28th day of March 1972.

(SEAL)
Attest:

EDWARD M. FLETCHER, JR.
Attesting Officer

ROBERT GOTTSCHALK
Commissioner of Patents